US00RE50045E

(19) United States
(12) Reissued Patent
Kim et al.

(10) Patent Number: US RE50,045 E
(45) Date of Reissued Patent: *Jul. 16, 2024

(54) APPARATUS AND METHOD FOR TRANSMITTING AND RECEIVING PACKETS IN A MOBILE COMMUNICATION SYSTEM SUPPORTING HYBRID AUTOMATIC REPEAT REQUEST

(71) Applicant: Samsung Electronics Co., Ltd., Gyeonggi-do (KR)

(72) Inventors: Soeng-Hun Kim, Gyeonggi-do (KR); Gert Jan Van Lieshout, Middlesex (GB); Hwan-Joon Kwon, Gyeonggi-do (KR); Ju-Ho Lee, Gyeonggi-do (KR)

(73) Assignee: Samsung Electronics Co., Ltd (KR)

( * ) Notice: This patent is subject to a terminal disclaimer.

(21) Appl. No.: 16/586,005

(22) Filed: Sep. 27, 2019

Related U.S. Patent Documents

Reissue of:
(64) Patent No.: 9,439,191
Issued: Sep. 6, 2016
Appl. No.: 14/728,582
Filed: Jun. 2, 2015

U.S. Applications:
(63) Continuation of application No. 16/123,768, filed on Sep. 6, 2018, which is an application for the reissue
(Continued)

(30) Foreign Application Priority Data

Aug. 7, 2007 (KR) ..... 10-2007-0079246
Nov. 8, 2007 (KR) ..... 10-2007-0113640

(51) Int. Cl.
*H04W 72/04* (2023.01)
*H04L 1/1812* (2023.01)
(Continued)

(52) U.S. Cl.
CPC ..... *H04W 72/0446* (2013.01); *H04L 1/1812* (2013.01); *H04L 1/1822* (2013.01); *H04L 1/1845* (2013.01); *H04W 72/20* (2023.01)

(58) Field of Classification Search
CPC ..... H04W 72/0446; H04W 72/0406; H04W 72/0426; H04W 72/0433; H04W 72/0453;
(Continued)

(56) References Cited

U.S. PATENT DOCUMENTS 7,321,589 B2 1/2008 Lohr et al.
7,366,477 B2 4/2008 Sebire et al.
(Continued)

FOREIGN PATENT DOCUMENTS

CN 1436012 8/2003
CN 1689262 10/2005
(Continued)

OTHER PUBLICATIONS

European Search Report dated May 8, 2020 issued in counterpart application No. 17156090.7-1205, 5 pages.
(Continued)

*Primary Examiner* — Minh Dieu Nguyen
(74) *Attorney, Agent, or Firm* — The Farrell Law Firm, P.C.

(57) ABSTRACT

An apparatus and a method are provided for operating HARQ in a mobile communication system. The method includes receiving a number of HARQ processes of a semi-persistent resource allocation and semi-persistent resource allocation interval information for a first transmission; receiving data in the first transmission at a subframe based on the semi-persistent resource allocation interval information; calculating a HARQ process IDentifier (ID) using the number of HARQ processes of the semi-persistent resource allocation, the semi-persistent resource allocation
(Continued)

interval information, and time information; receiving control information including the HARQ process ID on an L1 control channel; receiving data in a retransmission based on the control information including the HARQ process ID; combining the data received in the first transmission and the data received in the retransmission; and decoding the combined data.

18 Claims, 12 Drawing Sheets

Related U.S. Application Data of Pat. No. 9,439,191, which is a continuation of application No. 14/313,641, filed on Jun. 24, 2014, now Pat. No. 9,049,703, which is a continuation of application No. 14/010,038, filed on Aug. 26, 2013, now Pat. No. 8,787,327, which is a continuation of application No. 13/438,399, filed on Apr. 3, 2012, now Pat. No. 8,619,726, which is a continuation of application No. 12/187,762, filed on Aug. 7, 2008, now Pat. No. 8,160,033.

(51) Int. Cl.

| | |
|---|---|
| ***H04L 1/1822*** | (2023.01) |
| ***H04L 1/1829*** | (2023.01) |
| ***H04W 72/0446*** | (2023.01) |
| ***H04W 72/20*** | (2023.01) |
| *H04L 1/18* | (2023.01) |

(58) Field of Classification Search

CPC ..... H04W 72/1205; H04L 1/1812; H04L 1/1822; H04L 1/1825; H04L 1/1887; H04L 1/0069; H04B 7/00

See application file for complete search history.

(56) References Cited

U.S. PATENT DOCUMENTS

| | | | | |
|---|---|---|---|---|
| 7,657,815 | B2 | 2/2010 | Seidel et al. | |
| 7,668,110 | B2 * | 2/2010 | Seol | H04W 52/267 370/252 |
| 7,676,732 | B2 * | 3/2010 | Moon | H04L 1/0069 714/774 |
| 7,996,744 | B2 * | 8/2011 | Ojala | H04L 1/1887 714/748 |
| 8,320,341 | B2 | 11/2012 | Malkamaki et al. | |
| 9,049,703 | B2 * | 6/2015 | Kim | H04L 1/1822 |
| 9,439,191 | B2 | 9/2016 | Kim et al. | |
| 2002/0093937 | A1 | 7/2002 | Kim et al. | |
| 2003/0123470 | A1 | 7/2003 | Kim et al. | |
| 2004/0037224 | A1 | 2/2004 | Choi et al. | |
| 2004/0088634 | A1 | 5/2004 | Kim et al. | |
| 2006/0092972 | A1 | 5/2006 | Petrovic et al. | |
| 2006/0176856 | A1 | 8/2006 | Yang et al. | |
| 2006/0195576 | A1 | 8/2006 | Rinne et al. | |
| 2008/0101286 | A1 | 5/2008 | Wang et al. | |
| 2008/0225765 | A1 | 9/2008 | Marinier et al. | |
| 2009/0103500 | A1 | 4/2009 | Malkamaki et al. | |
| 2010/0017671 | A1 | 1/2010 | Cai et al. | |

FOREIGN PATENT DOCUMENTS

| | | |
|---|---|---|
| CN | 1819677 | 8/2006 |
| CN | 1917416 | 2/2007 |
| EP | 1 389 848 | 8/2002 |
| EP | 1 746 855 | 7/2006 |
| EP | 2 348 665 | 7/2011 |
| EP | 2 587 706 | 5/2013 |
| RU | 2 251 219 | 4/2005 |
| RU | 2 282 310 | 8/2006 |
| WO | WO 2004/062205 | 7/2004 |
| WO | WO 2005/088886 | 9/2005 |
| WO | WO 2005/125226 | 12/2005 |
| WO | WO 2006/101347 | 9/2006 |
| WO | WO 2006/114689 | 11/2006 |
| WO | WO 2006/074587 | 5/2008 |

OTHER PUBLICATIONS

Nokia, "Uplink Scheduling for VoIP", R2-070476, 3GPP TSG-RAN WG2 Meeting #57, Feb. 12-16, 2007, 15 pages.

3GPP,3rd Generation Partnership Project; Technical Specification Group Radio Access Network; Evolved Universal Terrestrial Radio Access (E-UTRA).

Medium Access Control (MAC) Protocol Specification (Release 8), 3GPP TS 36.321 V0.1.0, Jun. 2007, 17 pages.

Alcatel-Lucent, "Persistent DL Scheduling and VoIP", R2-071368, 3GPP TSG RAN WG2 #57bis, Mar. 26-30, 2007, 5 pages.

Ericsson, "MAC Stage 3 Text Proposal for Semi Persistent DL Scheduling", R2-072702, TSG-RAN WG2 Meeting #58bis, Jun. 25-29, 2007, 3 pages.

JP Notice of Allowance dated Feb. 7, 2012 issued in counterpart application No. 2010-519864, 6 pages.

Chinese Office Action dated Jun. 29, 2012 issued in counterpart application No. 200880101910.1, 10 pages.

European Search Report dated Jun. 28, 2017 issued in counterpart application No. 17156090.7-1875, 7 pages.

U.S. Office Action dated Sep. 20, 2021 issued in counterpart U.S. Appl. No. 16/585,894, 19 pages.

European Search Report dated Dec. 21, 2021 issued in counterpart application No. 21199368.8-1205, 6 pages.

Ericsson, "Handling of HARQ Retransmissions for LTE Uplink", R2-072580, TSG-RAN WG2 Meeting #58bis, Jun. 25-29, 2007, 4 pages.

European Search Report dated Mar. 9, 2023 issued in counterpart application No. 21199368.8-1213, 58 pages.

U.S. Notice of Allowance dated May 9, 2024 issued in counterpart U.S. Appl. No. 16/585,894, 9 pages.

Nokia Corporation, Nokia Siemens Networks, "Persistent Scheduling for DI.", R2-082302, 3GPP TSG-RAN WG2 Meeting #62, Apr. 28, 2008.

Samsung, "HARQ Retransmissions for the DL Persistent Scheduling", R2-083501, 3GPP TSG-RAN2 Meeting #62bis, Jun. 24, 2008.

Samsung, "HARQ Retransmissions for the DL Persistent Scheduling", R2-073386, 3GPP TSG-RAN2 Meeting #59, Aug. 14, 2007.

Ericsson, "Handling of HARQ Retransmissions for LTE Uplink", R2-072580, TSG-RAN WG2 Meeting #58bis, Jun. 22, 2007.

CMCC, Huawei: "Correction to DPDCH Gain Factor in Compressed Mode", 3GPP TSG RAN1 Meeting #48bis, R1-071368, Mar. 26-30, 2007.

Motorola: "CQI Feedback Schemes for E-UTRA", R1-072702, 3GPP TSG RAN1#49-bis, Jun. 25-29, 2007.

Samsung, "VoIP Support in LTE", 4.9, 3GPP TSG-RAN2 Meeting #58bis, Tdoc R2-072462, Jun. 25, 2007.

Samsung, "VoIP Support in LTE", 5.2.3, 3GPP TSG-RAN2 Meeting #56bis, Tdoc R2-070129, Jan. 15, 2007.

Chinese Office Action dated Mar. 31, 2015 issued in counterpart application No. 201210475098.7.

Rapporteur (Motorola), "Report of E-Mail Discussion: DL Scheduling", R2-063, TSG-RAN WG2, Dec. 12. 2006.

Philips, "Active HARQ Process ID", 3GPP TSG-RAN WG2 meeting #48, Aug. 29-Sep. 2, 2005.

LG Electronics, "Consideration on Control Signalling for MIMO-HARQ in E-UTRA Downlink", R1-071556, 3GPP TSG RAN WG1 Meeting #48bis, Mar. 26-30, 2007.

* cited by examiner

APPARATUS AND METHOD FOR TRANSMITTING AND RECEIVING PACKETS IN A MOBILE COMMUNICATION SYSTEM SUPPORTING HYBRID AUTOMATIC REPEAT REQUEST

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one Reissue Application has been filed for U.S. Pat. No. 9,439,191. This application is a Continuation Reissue of U.S. application Ser. No. 16/123,768, which is a Reissue Application of U.S. Pat. No. 9,439,191.*

PRIORITY

This application is a Continuation Application of U.S. patent application Ser. No. 14/313,641, filed in the U.S. Patent and Trademark Office (USPTO) on Jun. 24, 2014, which is a Continuation Application of U.S. patent application Ser. No. 14/010,038, filed in the USPTO on Aug. 26, 2013, issued as U.S. Pat. No. 8,787,327 on Jul. 22, 2014, which is a Continuation Application of U.S. patent application Ser. No. 13/438,399, filed in the USPTO on Apr. 3, 2012, issued as U.S. Pat. No. 8,619,726 on Dec. 31, 2013, which is a Continuation Application of U.S. patent application Ser. No. 12/187,762, filed in the USPTO on Aug. 7, 2008, issued as U.S. Pat. No. 8,160,033 on Apr. 17, 2012, and claims priority under 35 U.S.C. §119(a) to Korean Patent Application Nos. 10-2007-0079246 and 10-2007-0113640, which were filed in the Korean Intellectual Property Office on Aug. 7, 2007 and Nov. 8, 2007, respectively, the disclosures of all of which are incorporated herein by reference.

BACKGROUND OF THE INVENTION

1. Field of the Invention

The present invention relates generally to an apparatus and method for transmitting and receiving packets in a mobile communication system, and in particular, to an apparatus and method for transmitting and receiving packets in a mobile communication system supporting Hybrid Automatic Repeat reQuest (HARQ).

2. Description of the Related Art

Mobile communication systems, which were conventionally developed to provide communication services for mobile users, are evolving to provide various additional services as they progress toward the $3^{rd}$ Generation (3G) standard through the $1^{st}$ and $2^{nd}$ Generation standards. More specifically, mobile communication systems are developing to provide packet data services while providing voice services as their basic services. Despite the development of the mobile communication systems, the voice services are still expected to keep their status as the key services.

Long Term Evolution (LTE), one of the next generation mobile communication systems, standardization work on which is now in progress in the $3^{rd}$ Generation Partnership Project (3GPP), is determining a way to provide voice services using a Voice over Internet Protocol (VoIP) technique. In providing the voice services using the VoIP technique, semi-persistent resource allocation is used to avoid the burden of transmitting resource allocation information for all VoIP packets. The term "semi-persistent resource" as used herein refers to transmission resources that are periodically allocated to a particular User Equipment (UE) without separate allocation information. VoIP packets are normally provided using semi-persistent resources because the voice services should continually be allocated with the resources for a predetermined time.

When the semi-persistent resources are provided only for HARQ initial transmission or first HARQ transmission, the normal resources are provided for HARQ retransmissions.

FIG. 1 is a diagram illustrating transmission and reception of VoIP packets through semi-persistent resources. Referring to FIG. 1, semi-persistent resource intervals 165 provide VoIP communication service to an arbitrary UE. The hatched downlink semi-persistent resources 105, 145, and 170 are allocated in every semi-persistent resource interval 165.

A UE receives a downlink packet through the first semi-persistent resource 105. The UE checks for an error in the downlink packet. If there is an error in the downlink packet, the UE transmits an HARQ Negative Acknowledge (NACK) signal 110 using an uplink resource at a predetermined timing. Thereafter, an Evolved Node B (ENB) provides information indicating transmission of an HARQ retransmission packet to the UE through a control channel at an arbitrary timing denoted by reference numeral 115, and transmits the HARQ retransmission packet at a timing denoted by reference numeral 120. Upon receiving the HARQ retransmission packet, the UE soft-combines it with an HARQ packet stored in an HARQ process and checks for an error therein. If an error still exists, the UE retransmits an HARQ NACK signal 125 through an uplink resource at a predetermined timing. If the error still exists, even after a predetermined number of HARQ retransmissions, the UE ends the retransmission routine. However, before the predetermined number of retransmissions are made, the UE repeats the operation of soft-combining the HARQ retransmission packet with the packet stored in its associated process until the error is removed through the HARQ retransmissions.

As described above, the HARQ operation is a technique for soft-combining a packet having an error with its retransmitted packet, thereby reducing an error possibility of the packet. During HARQ retransmission, the ENB includes resource allocation information and an HARQ process identifier together in Layer 1 (L1)/Layer 2 (L2) control information, which is transmitted through a predetermined downlink control channel, to notify the UE of an HARQ process, a packet stored in which should be soft-combined with an arbitrary HARQ retransmission packet. For example, as illustrated in FIG. 1, a retransmission packet with an HARQ process identifier=x is soft-combined with a packet stored in a process with an HARQ process identifier=x.

However, when the semi-persistent resources are used, no L1/L2 control information is transmitted in initial HARQ transmission or first n HARQ transmissions. In this case, even the HARQ process identifier is not transmitted. Therefore, because the reception device cannot map the packet received through the semi-persistent resources to the retransmitted HARQ packet, it cannot normally perform HARQ soft-combining. In addition, when there are several HARQ packets received through semi-persistent resources at an arbitrary timing, it is not clear with which packet an arbitrary retransmission packet should be soft-combined.

If the semi-persistent resource interval 165 expires before the HARQ operation of the packet received through the first semi-persistent resource 105 is completed, i.e., if the corresponding semi-persistent resource interval 165 expires when the NACK signal has been transmitted three times and 2 retransmissions have been made, as illustrated in FIG. 1, the next semi-persistent resource interval starts, so a new packet may be transmitted through the second semi-persistent resource 145.

However, the UE checks for an error of a downlink packet even for the new packet received through the semi-persistent resource 145 of the next interval, and if there is an error in the downlink packet, the UE transmits a NACK signal 150 through uplink transmission resources for transmitting a NACK/ACK signal at a predetermined timing for the UE. Thereafter, when a retransmitted packet is received, currently, there is no way to determine whether the retransmitted packet is a retransmission packet for the packet 105 whose retransmission was not completed in the previous interval, or whether the retransmitted packet is a retransmission packet for the packet 145 received through resources allocated in the current semi-persistent resource interval.

SUMMARY OF THE INVENTION

Accordingly, the present invention has been designed to address at least the above problems and/or disadvantages and to provide at least the advantages described below. An aspect of the present invention is to provide an apparatus and method for soft-combining packets using semi-persistent resources in a mobile communication system supporting HARQ.

Another aspect of the present invention is to provide an apparatus and method for reducing soft-combining error for retransmission packets in a mobile communication system supporting HARQ.

Another aspect of the present invention is to provide an apparatus and method for preventing unnecessary retransmission due to soft-combining error for retransmission packets in a mobile communication system supporting HARQ.

Another aspect of the present invention is to provide an apparatus and method for transmitting and receiving HARQ packets.

In accordance with an aspect of the present invention, a method is provided for operating HARQ in a mobile communication system. The method includes receiving a number of HARQ processes of a semi-persistent resource allocation and semi-persistent resource allocation interval information for a first transmission; receiving data in the first transmission at a subframe based on the semi-persistent resource allocation interval information; calculating a HARQ process IDentifier (ID) using the number of HARQ processes of the semi-persistent resource allocation, the semi-persistent resource allocation interval information, and time information; receiving control information including the HARQ process ID on an L1 control channel; receiving data in a retransmission based on the control information including the HARQ process ID; combining the data received in the first transmission and the data received in the retransmission; and decoding the combined data.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS

Various embodiments of the present invention will now be described in detail with reference to the annexed drawings. In the following description, a detailed description of known functions and configurations incorporated herein has been omitted for clarity and conciseness. Further, terms used herein are defined based on functions in the present invention and may vary according to users, operator intention, or usual practices. Therefore, the definition of the terms should be made based on contents throughout the specification.

The present invention will be described herein with reference to 4 preferred embodiments. In a first embodiment of the present invention, a UE and an ENB previously agree upon an identifier of a HARQ process that they will use for a HARQ operation of a packet received through semi-persistent resources, in order to combine it with a packet received through semi-persistent resources during retransmission, using the previously agreed identifier of the HARQ process.

In the second and third embodiments of the present invention, when a packet has been received through semi-persistent resources and there are several packets for which HARQ reception has not been completed, it is possible to determine a process, data in which should be soft-combined with the HARQ-retransmitted packet. Accordingly, the present invention provides an apparatus and method for setting up several HARQ processes for semi-persistent resources (hereinafter referred to as "semi-persistent resource-dedicated HARQ processes"), and defining a mapping relation between packets received through semi-persistent resources and identifiers of HARQ processes using a predetermined rule.

A fourth embodiment of the present invention provides a method for identifying a HARQ process where a packet subject to soft-combining is stored, using a retransmission number.

First Embodiment

In the first embodiment of the present invention, an ENB signals, to a UE to which semi-persistent resources will be allocated, an identifier of a semi-persistent resource-dedicated HARQ process and a soft-buffer size of the HARQ process through a call setup process. The UE and the ENB perform HARQ retransmission associated with a HARQ packet, which is later transmitted and received through semi-persistent resources through the semi-persistent resource-dedicated HARQ process.

Figure 1:
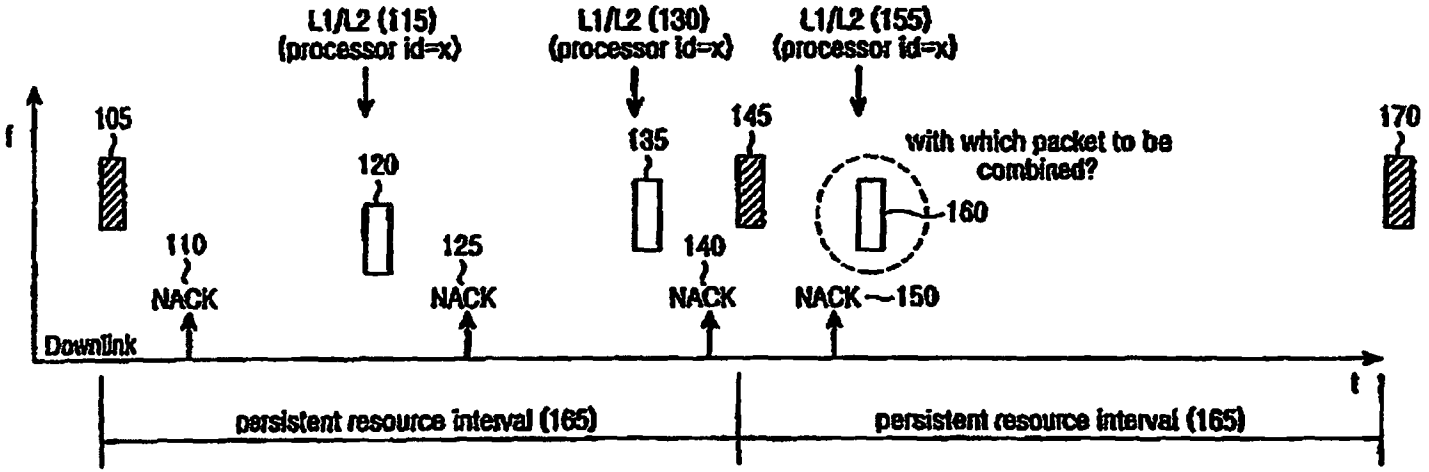
FIG.1 (PRIOR ART)
FIG. 1 is a diagram illustrating transmission and reception of VoIP packets through semi-persistent resources.
Figure 2:
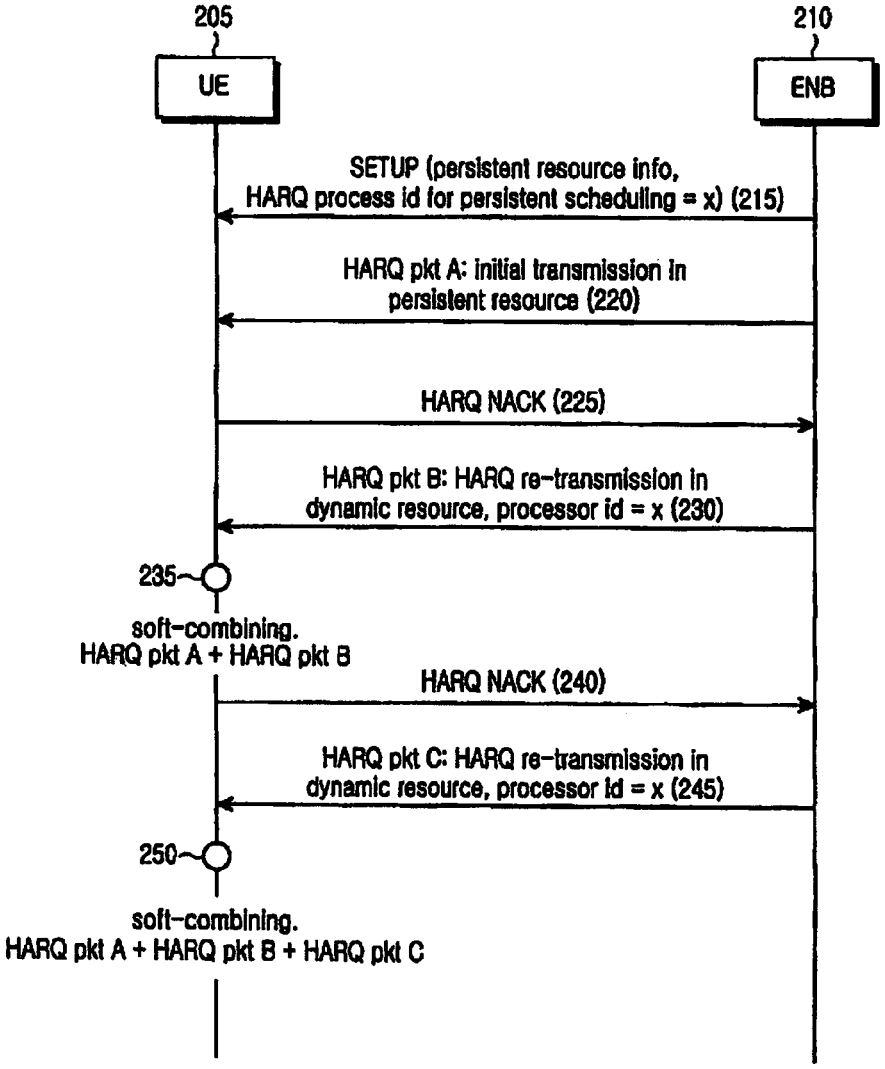
FIG. 2 is a signal flow diagram illustrating a procedure for transmitting and receiving HARQ retransmission packets between an ENB and a UE according to a first embodiment of the present invention.

FIG. 2 is a signal flow diagram illustrating a procedure for transmitting and receiving HARQ retransmission packets between an ENB and a UE according to the present invention.

Referring to FIG. 2, in a communication system including a UE 205 and an ENB 210, the ENB 210 transmits, in step 215, semi-persistent resource-related information, and an identifier and soft-buffer size of a semi-persistent resource-dedicated HARQ process to the UE 205 through a call setup message, such as a radio bearer setup message. The term "semi-persistent resource-dedicated HARQ process" as used herein refers to a HARQ process, which will be used for an HARQ operation of a packet received through semi-persistent resources. For ease of explanation, an identifier of the semi-persistent resource-dedicated HARQ process will be referred to herein as "x". The semi-persistent resource-related information can be, for example, an interval of semi-persistent resources. Information on the resources to be used as semi-persistent resources can be transmitted when actual data transmission and reception is impending.

The HARQ process identifier indicates a HARQ process, data stored in which should be soft-combined with the HARQ retransmission packet. The HARQ process includes therein a soft buffer for storing an HARQ packet having an error, and the HARQ process identifier is information indicating a soft buffer, data stored in which should be soft-combined with an arbitrary HARQ packet. Upon receipt of the set message, the UE 205 identifies a HARQ process identifier and a HARQ process buffer size it will use for a packet received through semi-persistent resources, and sets up a HARQ process having a soft buffer with the identified size. Further, the UE 205 identifies the HARQ process as a semi-persistent resource-dedicated HARQ process.

When the semi-persistent resources are allocated to the UE 205, the ENB 210 transmits a packet through the semi-persistent resources at a predetermined time. Therefore, the UE 205 receives the transmitted packet in step 220. Only first n HARQ transmissions can be carried out through the semi-persistent resources. In the following description, n will be assumed to be 1. In other words, only initial HARQ transmission is carried out through the semi-persistent resources. The packet received through semi-persistent resources in step 220 will be referred to herein as a "packet A". Because packet A is transmitted through semi-persistent resources, no L1/L2 control information is transmitted. Therefore, a HARQ process identifier for the packet A is not transmitted.

The UE 205 performs an error detection process, such as a Cyclic Redundancy Check (CRC) calculation, on the initial-transmitted packet A. If there is an error, the UE 205 stores the packet received through the semi-persistent resources in a HARQ process x, agreed upon as a semi-persistent resource-dedicated HARQ process. Herein, because the L1/L2 control information is not signaled together in the HARQ packet received through the semi-persistent resources, reference cannot be made to the HARQ process identifier, which is signaled along with the HARQ packet. Therefore, the present invention previously assigns a HARQ process for the HARQ packet received through semi-persistent resources, and stores the HARQ packet received through semi-persistent resources in the previously assigned HARQ process.

Thereafter, in step 225, the UE 205 transmits a negative HARQ feedback, i.e., a HARQ NACK, through transmission resources, such as a response channel, at a predetermined time. For example, the HARQ feedback can include 1-bit information.

Upon receipt of the negative HARQ feedback in step 225, the ENB 210 performs HARQ retransmission at a proper timing denoted by reference numeral 230, and if the corresponding HARQ retransmission is semi-persistent resource-related HARQ retransmission, the ENB 210 includes the HARQ process identifier x, which was agreed upon in the call setup process in an L1/L2 control channel before transmission. The UE 205, which transmitted the negative HARQ feedback for the HARQ packet received through semi-persistent resources, monitors the L1/L2 control channel to check if there is any HARQ packet scheduled thereto, in order to receive the HARQ packet transmitted in step 230. This check can be made through the HARQ process identifier.

More specifically, as an arbitrary HARQ packet is scheduled to the UE 205, if the HARQ packet is not a initial-transmitted HARQ packet, but is instead a retransmitted HARQ packet and a HARQ process identifier of the HARQ packet is a HARQ process identifier x agreed upon for semi-persistent resources, the UE 205 can determine that the retransmitted HARQ packet is semi-persistent resource-related retransmission. Therefore, in step 235, the UE 205 soft-combines the HARQ packet retransmitted in step 230 with the data stored in the process x, which is a semi-persistent resource-dedicated HARQ process.

Accordingly, when the retransmission HARQ packet received in step 230 is defined as a HARQ packet B, the UE 205 soft-combines the HARQ packet A with the HARQ packet B in step 235. After the soft-combining, the UE 205 performs an error detection process, such as CRC, to determine if there is an error. If the error still exists, despite the soft-combining, in step 240, the UE 205 transmits a negative HARQ feedback using transmission resources, such as a response channel, at a predetermined time.

In response, in step 245, the ENB 210 retransmits the HARQ packet using the agreed transmission resources at a predetermined time. In this case, the previously agreed x is used as the HARQ process identifier of the retransmitted HARQ packet, indicating that the retransmitted HARQ packet is semi-persistent resource-related retransmission.

Upon sensing HARQ retransmission including a HARQ process identifier through an L1/L2 control channel in step 245, the UE 205 identifies that the retransmitted HARQ packet is semi-persistent resource-related retransmission. Thereafter, the UE 205 soft-combines the HARQ packet with the data stored in a soft buffer identified by the process identifier x, and checks for an error therein. For example, if the HARQ packet received in step 245 is referred to as a HARQ packet C, the UE 205 soft-combines the HARQ packet C received along with the HARQ process identifier x, with the data stored in the HARQ process x, i.e., the data obtained by soft-combining the HARQ packet A with the HARQ packet B. The UE 205 continues the HARQ operation until a predetermined condition is satisfied, for example, until there is no error in the soft-combined HARQ packet or the retransmission has reached a maximum number of retransmissions.

Figure 3:
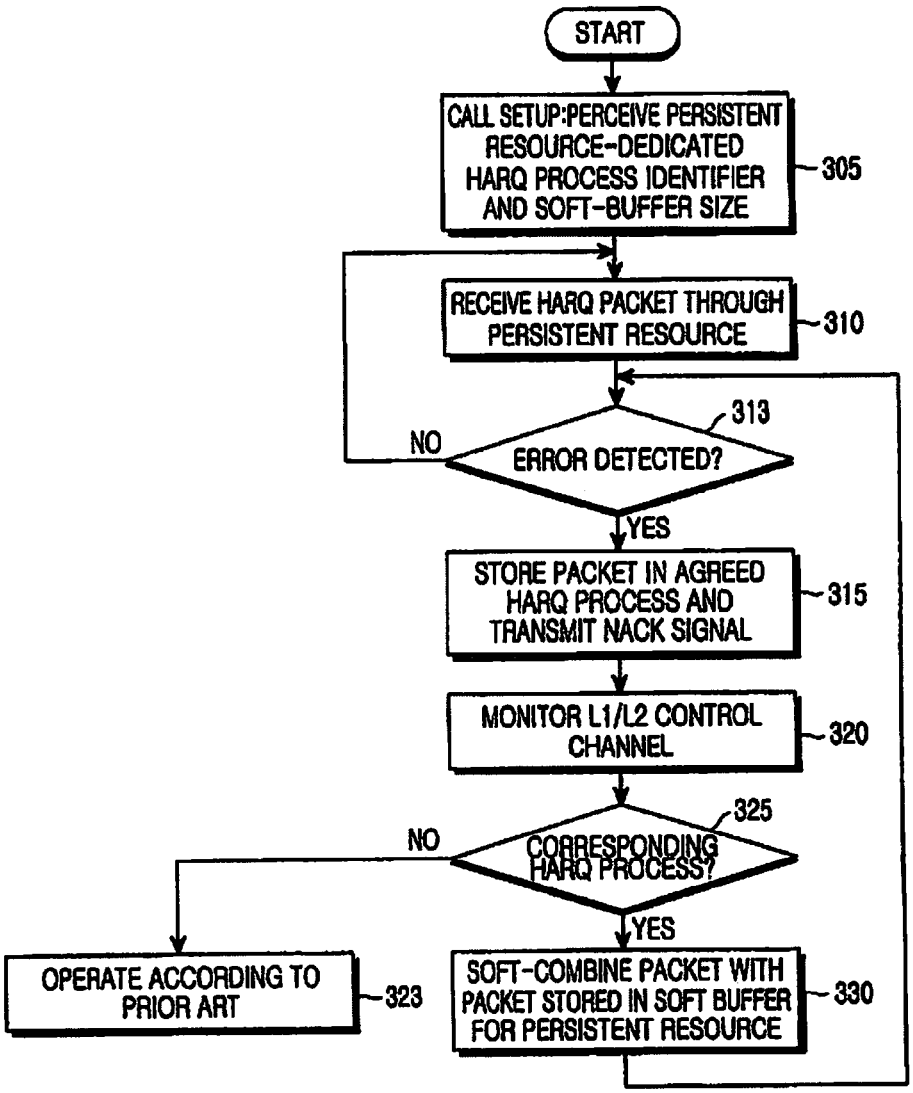
FIG. 3 is a flowchart illustrating an operation of HARQ-receiving semi-persistent resources in a UE according to the first embodiment of the present invention.

FIG. 3 is a flowchart illustrating an operation of HARQ-receiving semi-persistent resources in a UE according to the present invention.

Referring to FIG. 3, in a call setup process of step 305, the UE receives a signal including an identifier and a soft-buffer size of a semi-persistent resource-dedicated HARQ process. The UE assigns a soft buffer corresponding to the soft-buffer size as a soft buffer for semi-persistent resources, and maps the soft buffer to the HARQ process identifier.

When semi-persistent resources are allocated to the UE, the UE receives a HARQ packet through the semi-persistent resources in step 310. Upon receipt of the HARQ packet, the UE performs CRC calculation on the HARQ packet in step 313 to check if there is an error in the HARQ packet. If there is no error, the UE delivers the HARQ packet to an upper layer, and then waits until an HARQ packet is received through semi-persistent resources in step 310.

However, if there is an error in step 313, in step 315, the UE stores the packet received through semi-persistent resources in the agreed semi-persistent resource-dedicated HARQ process, and transmits a negative response signal (NACK) through a response channel Thereafter, in step 320, the UE monitors an L1/L2 control channel to receive HARQ retransmission. Thereafter, the UE checks, in step 325, if there is a HARQ packet scheduled thereto. This check can be made by checking if a HARQ process identifier of the HARQ packet corresponds to an identifier of the semi-persistent resource-dedicated HARQ process. Therefore, in step 325, if the HARQ process is the agreed HARQ process, in step 330, the UE soft-combines the received HARQ packet with the HARQ packet stored in the assigned semi-persistent resource-dedicated HARQ process. Thereafter, the UE performs an error detection operation in step 313. The UE repeats the HARQ operation until the predetermined condition is satisfied.

However, if the HARQ process is not the agreed HARQ process in step 325, in step 323, the UE performs a predetermined necessary operation corresponding to the above-described prior art. That is, the UE performs an operation of determining a HARQ process, data in which it will soft-combine with the HARQ packet, depending on the HARQ process identifier of the received HARQ packet, checking for an error therein, and transmitting HARQ feedback information.

By previously appointing an identifier and a soft-buffer size of the scheduled semi-persistent resource-dedicated HARQ process, as described above, the UE can determine with which HARQ retransmission packet it should combine the HARQ packet received through semi-persistent resources, without L1/L2 control information.

Second Embodiment

As described above, in the first embodiment of the present invention, only one semi-persistent resource-dedicated HARQ process is allocated. However, this restricts HARQ retransmission for an arbitrary semi-persistent resource to be completed before until a semi-persistent resource allocation timing of a next interval. That is, when there is only one semi-persistent resource-dedicated HARQ process identifier, it is not possible to determine whether HARQ retransmission 160 is retransmission for the HARQ packet 145 transmitted through semi-persistent resources, or for the HARQ packet 105 transmitted through semi-persistent resources. As a result, the HARQ retransmission still cannot be carried out after the next semi-persistent resource allocation timing.

Therefore, to solve this problem, a second embodiment of the present invention assigns several semi-persistent resource-dedicated HARQ processes, and defines a rule in which semi-persistent resource-used timings and semi-persistent resource-dedicated HARQ processes are mapped on a one-to-one basis.

For example, if an HARQ process x and an HARQ process y are assigned for semi-persistent resources and an arbitrary HARQ packet is received through semi-persistent resources at a time z, an equation is defined such that the timing information z is mapped to the HARQ process x or HARQ process y on a one-to-one basis, thereby making it possible to determine the timing, semi-persistent resources allocated at which are mapped to the HARQ packet received along with the process identifier x or y at an arbitrary timing. Because the semi-persistent resources are periodically allocated at regular intervals as stated above, there are several possible methods for replacing the timing at which semi-persistent resources are allocated with a cyclic integer, and a preferred example thereof will be given below.

Most mobile communication systems include a system counter that increases at intervals of predetermined time to maintain consistent time information. An ENB includes the counter value in system information to notify it to UEs so that the UE and the ENB may share the same time information. The UMTS mobile communication system uses, as the system counter, a System Frame Number (SFN) that increases every 10 msec. The LTE system also uses a similar counter, and is assumed herein to use an SFN that increases every 10 msec, like the UMTS system. Frames based on this assumption are illustrated in FIG. 4.

Figure 4:
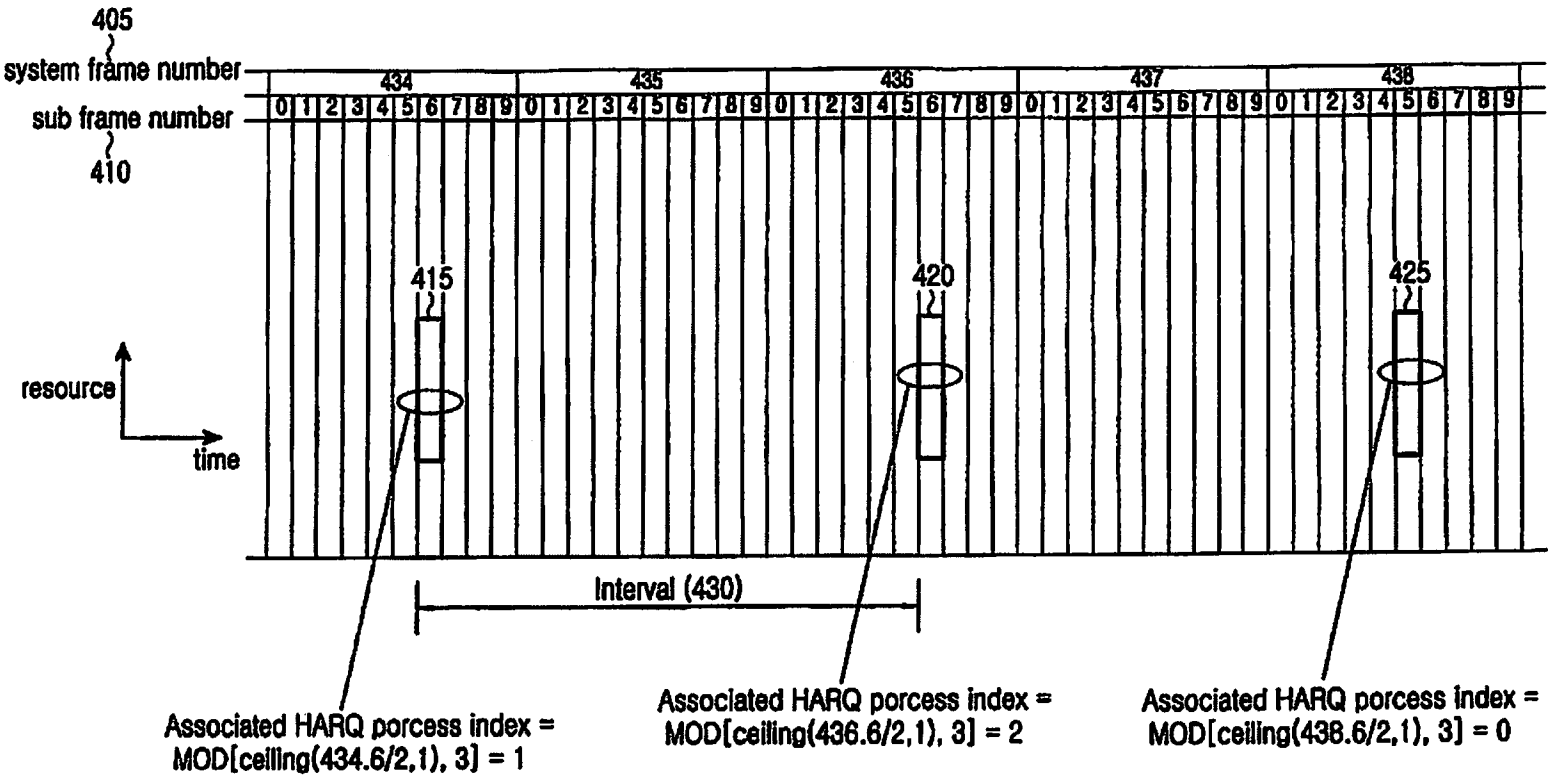
FIG. 4 is a diagram illustrating frames of an LTE system and their SFNs and subframe numbers according to a second embodiment of the present invention.

FIG. 4 is a diagram illustrating frames of the LTE system and their SFNs and subframe numbers on the forgoing assumption according to the present invention.

In FIG. 4, the horizontal axis represents time, and the vertical axis represents resources. Shown on the top of the drawing are SFNs 405 and subframe numbers 410 of #0-#9 for every SFN. In the LTE system, as illustrated in the drawing, the minimum time unit is a subframe with a 1-msec size, 10 subframes constitute one frame, and each frame is assigned an individual SFN. The SFN has a finite size, and if 12-bit SFN is used as in UMTS, the SFN has a value circulating between 0 and 4095. In the LTE system, an arbitrary subframe is identified by the subframe numbers 410 having a value between 0 and 9, and the SFN 405 having a value between 0 and 4095.

The time at which arbitrary semi-persistent resources are allocated can be replaced with an SFN and a subframe number, and a combination of the SFN and the subframe number will be called herein "time information". Time information can be expressed as shown in Equation (1).

$$\text{time information}=\text{SFN}+\text{subframe number}\times 0.1 \quad (1)$$

For example, time information of semi-persistent resource 415 is (434, 6), and time information of semi-persistent resource 420 is (436, 6). Calculating a semi-persistent resource-dedicated HARQ process identifier from the time information of the semi-persistent resources at a particular time is possible by defining a function having, as its inputs, a semi-persistent resource allocation interval 430 and the number of HARQ processes allocated for (or associated with) semi-persistent resources. Therefore, a semi-persistent resource-dedicated HARQ process identifier can be expressed as shown in Equation (2).

$$\text{semi-persistent resource-dedicated HARQ process identifier}=F1(i,n,t) \quad (2)$$

In Equation (2), i denotes a semi-persistent resource allocation interval expressed in units of 10 msec, n denotes the number of semi-persistent resource-dedicated HARQ processes, and t denotes time information of the timing at which semi-persistent resources are allocated.

For example, regarding calculation of an index of the semi-persistent resource-dedicated HARQ process, an index of a HARQ process can be calculated from time information using the method of Equation (3), and an actual identifier of the HARQ process can be determined from the index.

$$\text{semi-persistent resource-dedicated HARQ process's index}=MOD[s,n],s=ceiling[t/i,1] \quad (3)$$

In Equation (3), i denotes a semi-persistent resource allocation interval expressed in units of 10 msec, n denotes the number of semi-persistent resource-dedicated HARQ processes, and t denotes time information of the timing at which semi-persistent resources are allocated.

The HARQ process index, converted into an integer of the semi-persistent resource-dedicated HARQ process, is information related to a relative sequence of the particular HARQ process in a set of semi-persistent resource-dedicated HARQ processes. For example, if $x_0, x_1, x_2, \ldots, x_n$ are assigned to an arbitrary UE as semi-persistent resource-dedicated HARQ process identifiers, a process index 0 indicates an HARQ process $x_0$, an index 1 indicates an HARQ process $x_1$, an index 2 indicates an HARQ process $x_2$, and an index n indicates an HARQ process $x_n$. A relation between the semi-persistent resource-dedicated HARQ process identifiers and the HARQ process indexes can be notified to the UE through a call setup process.

It is assumed in Equation (3) that one semi-persistent resource is allocated in one interval. That is, Equation (3) is applied when semi-persistent resources are allocated only for HARQ initial transmission. If several semi-persistent resources are allocated in one interval, for example, if semi-persistent resources are allocated so that they can be used for first n HARQ transmissions, t, in Equation (3), denotes time information for the time at which semi-persistent resources used for initial transmission are allocated. If Equation (3) is applied on the assumption that a semi-persistent resource allocation interval is 20 msec and the number of semi-persistent resource-dedicated HARQ processes is 3, a HARQ process index for the first semi-persistent resource 415 is 1, and its associated HARQ process identifier is $x_1$. Further, a HARQ process index for the second semi-persistent resource 420 is 2, and its associated HARQ process identifier is $x_2$. Finally, a HARQ process index for the semi-persistent resource 425 is 0, and its associated HARQ process identifier is $x_0$.

Therefore, if the UE initially receives a HARQ packet through semi-persistent resources, it calculates a HARQ process identifier associated with the HARQ packet using time information for the initial reception timing, and then identifies HARQ retransmission for the HARQ packet using the HARQ process identifier.

Figure 5:
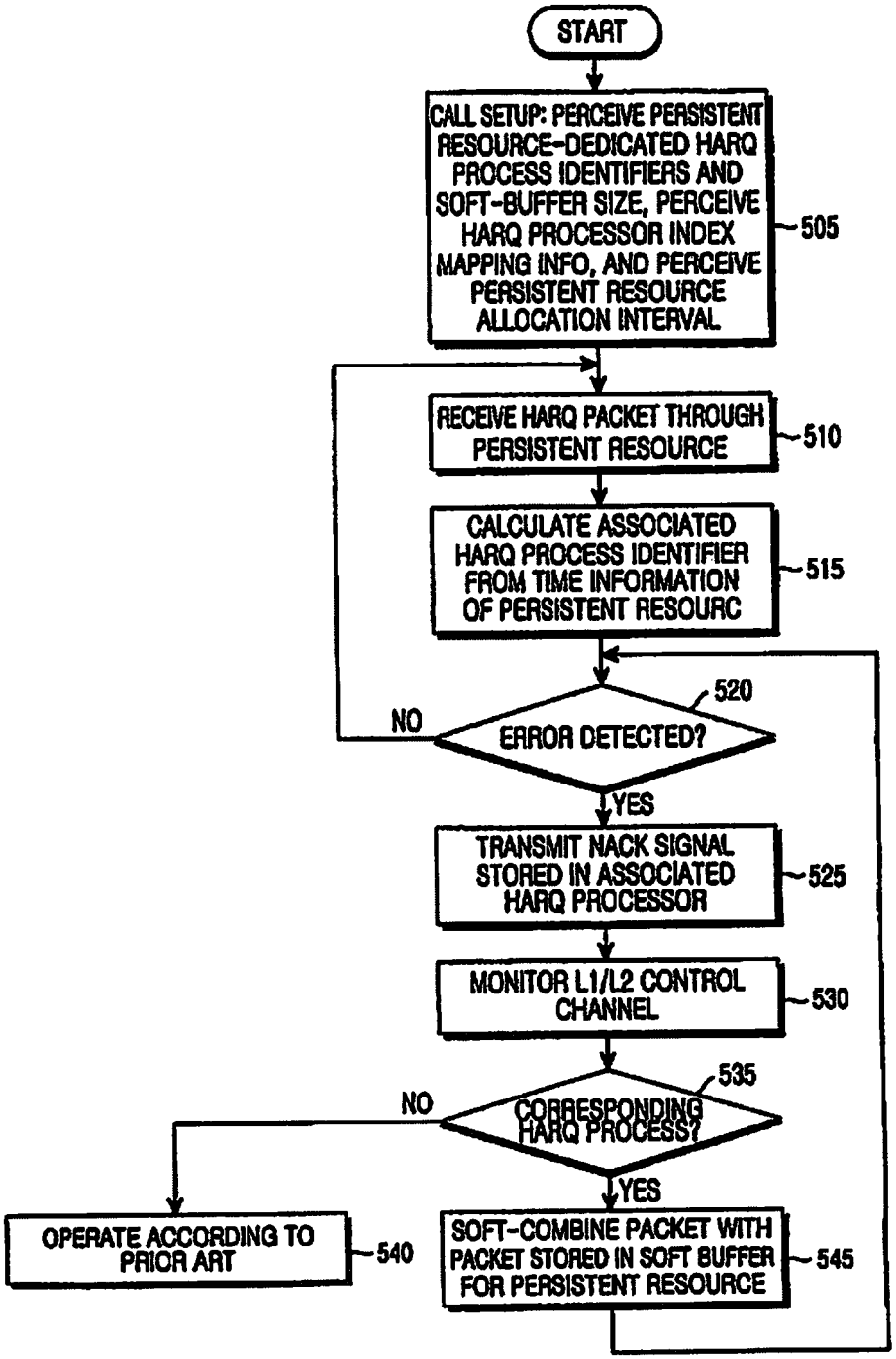
FIG. 5 is a flowchart illustrating an operation of HARQ-receiving data in a UE according to the second embodiment of the present invention.

FIG. 5 is a flowchart illustrating an operation of HARQ-receiving data in a UE according to the second embodiment of the present invention.

Referring to FIG. 5, in step 505, the UE performs call setup. During the call setup, the UE receives information on semi-persistent resource-dedicated HARQ processes identifiers and soft-buffer size. When the number of HARQ processes allocated for semi-persistent resources is defined as n, the UE assigns n soft buffers corresponding to the buffer size for semi-persistent resources. In addition, the UE receives a signaling including mapping information between the semi-persistent resource-dedicated HARQ process identifier indexes and the HARQ process identifiers in the call setup process. In short, when n processes $x_0, x_1, x_2, \ldots, x_{n-1}$ are allocated for semi-persistent resources, the UE perceives the relation between the HARQ process identifier indexes and the actual HARQ process identifiers based on the mapping information. For example, when HARQ process 1, HARQ process 3, and HARQ process 7 are allocated for semi-persistent resources, the mapping information between the semi-persistent resource-dedicated HARQ process identifier indexes and the HARQ process identifiers can be expressed as shown in Equation (4).

$$\text{HARQ process 1}=\text{HARQ process identifier index 0}$$

$$\text{HARQ process 3}=\text{HARQ process identifier index 1}$$

$$\text{HARQ process 7}=\text{HARQ process identifier index 2} \quad (4)$$

The UE receives a signaling indicating a semi-persistent resource allocation interval in the call setup process. For ease of explanation, the semi-persistent resource allocation interval expressed in units of frames will be referred to herein as "i". If the semi-persistent resource allocation interval is 20 msec, i is set to 2 (i=2).

After semi-persistent resources are allocated to the UE at an arbitrary time, the UE receives, in step 510, a HARQ packet through semi-persistent resources that periodically come. Upon receiving the HARQ packet through semi-persistent resources, in step 515, the UE calculates a HARQ process index to be applied to the HARQ packet received through semi-persistent resources using Equation (3), and checks a HARQ process identifier indicated by the index. Further, the UE maps the HARQ packet received through semi-persistent resources to the HARQ process identifier. Thereafter, the UE performs CRC calculation on the HARQ packet received through semi-persistent resources in step 520 to check if there is an error in the HARQ packet.

If there is no error, the UE delivers the HARQ packet to an upper layer, and then waits until an HARQ packet is received through the next semi-persistent resources in step 510.

However, if there is an error, in step 525, the UE stores the packet received through semi-persistent resources in the HARQ process corresponding to the HARQ process identifier calculated in step 515, and transmits a negative response signal NACK through a response channel Thereafter, in step 530, the UE monitors an L1/L2 control channel to receive HARQ retransmission. Upon detecting a HARQ packet scheduled thereto, in step 535, the UE checks if the HARQ process identifier of the HARQ packet corresponds to the semi-persistent resource-dedicated HARQ process calculated in step 515. If the HARQ process identifier of the HARQ packet corresponds to the semi-persistent resource-dedicated HARQ process, the UE proceeds to step 545, and otherwise, proceeds to step 540.

In step 540, the UE performs a predetermined necessary operation according to the prior art. That is, the UE determines a HARQ process, a packet stored in which it will soft-combine with the received HARQ packet depending on the HARQ process identifier of the received HARQ packet, checking presence/absence of an error therein, and transmitting HARQ feedback information according to the check result. However, in step 545, the UE soft-combines the received HARQ packet with the data stored in the corresponding semi-persistent resource-dedicated HARQ process. Thereafter, the UE returns to step 520 where it performs an error detection operation. The UE then repeats the HARQ operation until a predetermined condition is satisfied.

Third Embodiment

The third embodiment of the present invention maps an arbitrary HARQ process identifier to a HARQ process where data to be subject to soft-combining is stored, using a relative allocation sequence of semi-persistent resources from the timing at which a semi-persistent resource-dedicated HARQ process identifier is received through an L1/L2 control channel. An ENB and a UE agree to use n HARQ processes for semi-persistent resources, and assign not the absolute identifiers, but relative identifiers to the semi-persistent resource-dedicated HARQ processes. For example, the relative identifier indicates what previous interval, a HARQ packet transmitted though semi-persistent resources in which should be soft-combined with the retransmission HARQ packet.

More specifically, the UE and the ENB agree on the meanings of the semi-persistent resource-dedicated HARQ process identifiers and the HARQ process identifiers in the call setup process, as follows. The agreement is previously made so that a HARQ process $x_0$ used for semi-persistent resources indicates a HARQ process in which a HARQ packet received through semi-persistent resources allocated in the just previous interval is stored; a HARQ process $x_1$ means an HARQ process in which an HARQ packet received through semi-persistent resources allocated in the second previous interval is stored; and a HARQ process $x_2$ means a HARQ process in which an HARQ packet received through semi-persistent resources allocated in a third previous interval is stored.

Figure 6:
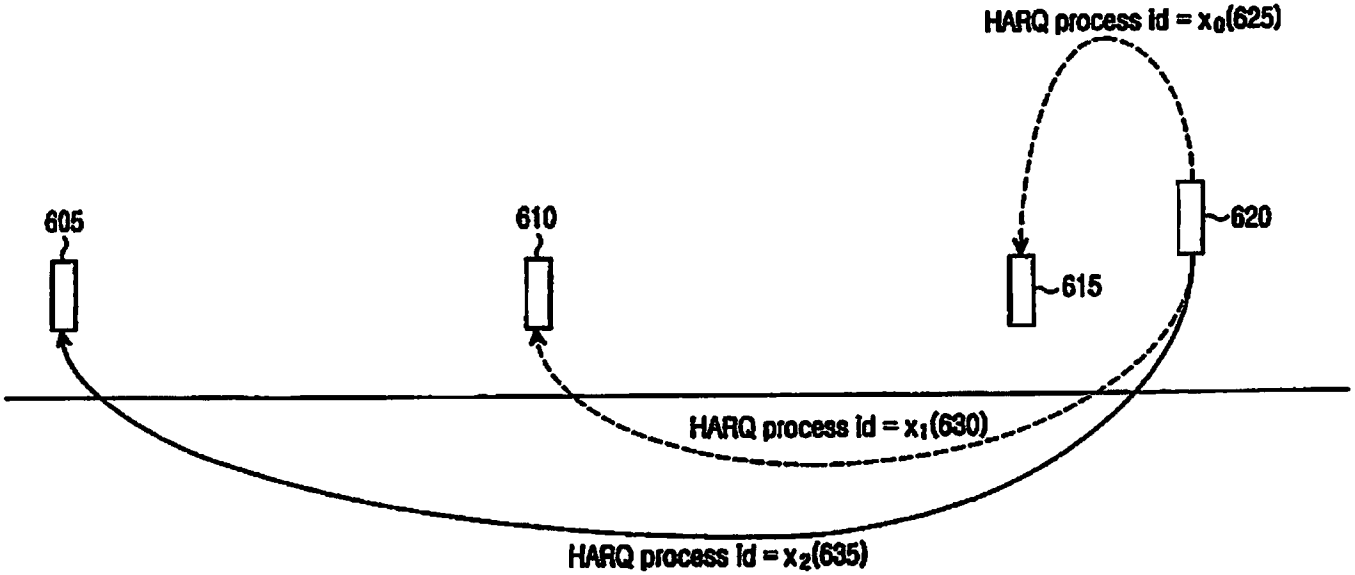
FIG. 6 is a diagram illustrating a procedure for HARQ-processing semi-persistent resources according to a third embodiment of the present invention.

FIG. 6 is a diagram illustrating a procedure for HARQ-processing semi-persistent resources according to the third embodiment of the present invention.

Referring to FIG. 6, if a UE initially receives an HARQ packet through semi-persistent resource, the UE stores the HARQ packet in an arbitrary HARQ process where no data is stored, among the HARQ processes allocated for semi-persistent resources. Thereafter, the UE can receive retransmission of the HARQ packet at an arbitrary time as illustrated by reference numeral 620. Then the UE checks a HARQ process identifier of the HARQ packet. If the HARQ identifier is $x_0$ (625), the UE delivers the retransmission HARQ packet to an HARQ process in which an HARQ packet 615 received through the just previous semi-persistent resource is stored. That is, the UE soft-combines the HARQ packet 620 transmitted along with the HARQ process identifier $x_0$ with the data stored in the HARQ process in which the HARQ packet 615 received through the just previous semi-persistent resource is stored.

If the HARQ identifier is $x_1$ (630), the UE identifies that the HARQ identifier indicates a HARQ process in which a HARQ packet 610 received through the second previous semi-persistent resource is stored. Then the UE soft-combines the HARQ packet 620 with the data stored in the HARQ process. If the HARQ identifier is $x_2$ (635), the UE identifies that the HARQ identifier indicates a HARQ process in which a HARQ packet 605 received through the third previous semi-persistent resource is stored. Then the UE soft-combines the HARQ packet 620 with the HARQ packet stored in the HARQ process.

Figure 7:
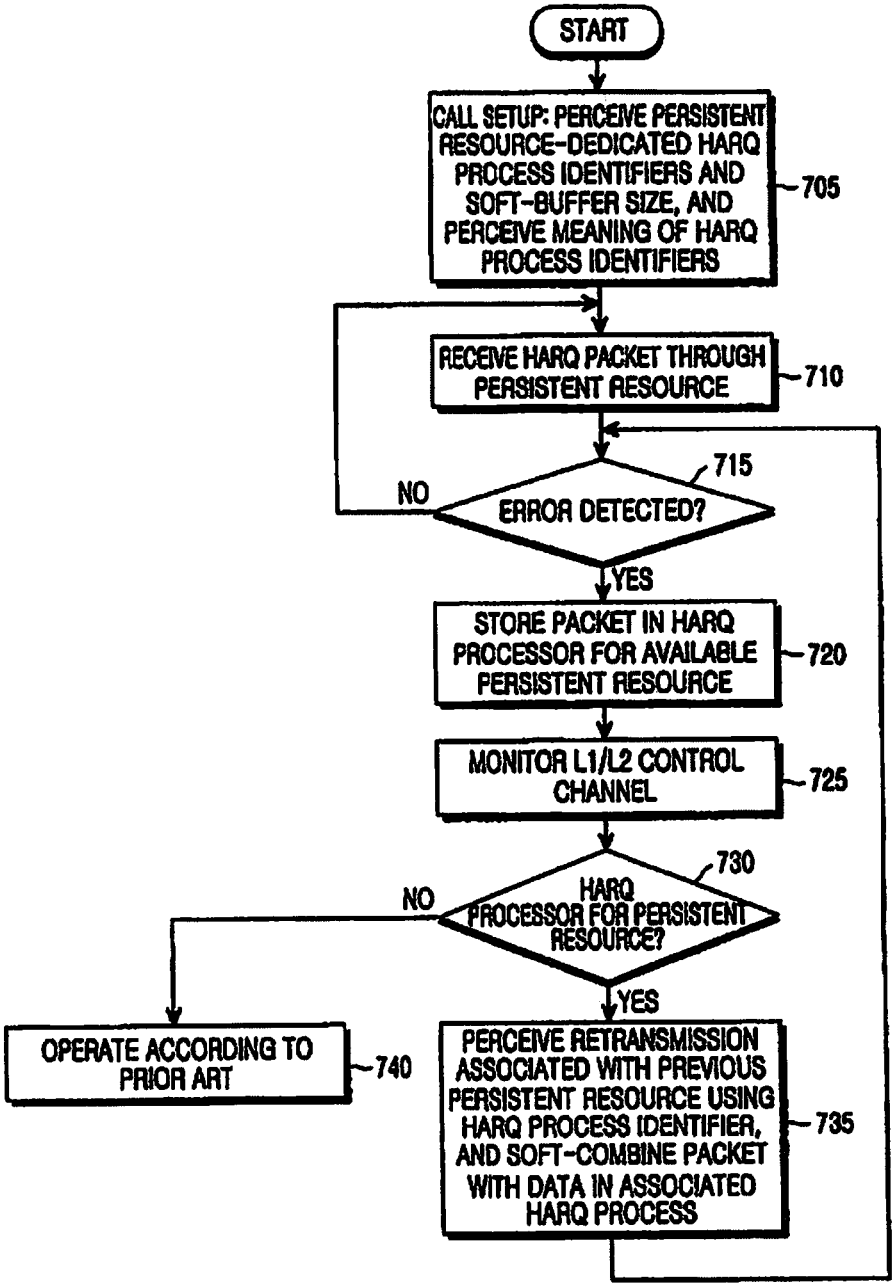
FIG. 7 is a flowchart illustrating an operation of receiving a HARQ packet in a UE according to the third embodiment of the present invention.

FIG. 7 is a flowchart illustrating an operation for receiving a HARQ packet in a UE according to the third embodiment of the present invention.

Referring to FIG. 7, in a call setup process of step 705, the UE receives a signal including semi-persistent resource-dedicated HARQ processes identifiers and soft-buffer size. When the number of HARQ processes allocated for semi-persistent resources is defined as n, the UE allocates n soft buffers corresponding to the buffer size for semi-persistent resources. The UE receives a signal indicating the meaning of the semi-persistent resource-dedicated HARQ process identifier in the call setup process. That is, the UE receives a signaling including information indicating what previous semi-persistent resource, an identifier of a process associated with which a particular HARQ process identifier corresponds to. The UE identifies n processes $x_0, x_1, x_2, \ldots, x_{n-1}$ as semi-persistent resource-dedicated HARQ process identifiers, and the meaning of each HARQ process identifier is defined as Equation (5).

$$\begin{aligned}
&\text{HARQ process } x_0 = \text{process identifier associated with just previous semi-persistent resource}\\
&\text{HARQ process } x_1 = \text{process identifier associated with second previous semi-persistent resource}\\
&\text{HARQ process } x_2 = \text{process identifier associated with third previous semi-persistent resource}\\
&\text{HARQ process } x_{n-1} = \text{process identifier associated with } n^{th} \text{ previous semi-persistent resource}
\end{aligned} \tag{5}$$

If the UE, which has completed the call setup process, is allocated semi-persistent resources at an arbitrary time, the UE receives a HARQ packet through the semi-persistent resources in step 710. Thereafter, the UE performs CRC calculation on the HARQ packet received through the semi-persistent resource in step 715 to check if there is an error in the HARQ packet. If there is no error, the UE delivers the HARQ packet to an upper layer, and then waits until an HARQ packet is received through the next semi-persistent resources in step 710.

However, if there is an error, in step 720, the UE stores the HARQ packet including the error as it is received through the semi-persistent resources, in one of the currently unused semi-persistent resource-dedicated HARQ processes in which no data is stored, and then transmits a NACK signal. Thereafter, in step 725, the UE monitors an L1/L2 control channel to receive HARQ retransmission. If the UE receives a HARQ packet scheduled thereto while monitoring the L1/L2 control channel, the UE checks in step 730 if a HARQ process identifier of the HARQ packet corresponds to any one of the semi-persistent resource-dedicated HARQ processes calculated in step 715. If the HARQ process identifier of the received HARQ packet corresponds to any one of the semi-persistent resource-dedicated HARQ processes, the UE proceeds to step 735, and otherwise, proceeds to step 740.

In step 740, the UE performs a predetermined operation according to the prior art. That is, the UE performs an operation of soft-combining the received HARQ packet with the packet stored in the HARQ process indicated by an HARQ process identifier of the HARQ packet, checking presence/absence of an error therein, and transmitting HARQ feedback information.

However, in step 735, the UE checks the process, a packet associated with which corresponds to the HARQ packet, depending on the HARQ process identifier of the received HARQ packet. That is, if the HARQ process identifier is $x_m$, the UE identifies that the process identifier indicates a process associated with the $m^{th}$ previous semi-persistent resource. Therefore, the UE soft-combines the received HARQ packet with the data stored in the process in which the HARQ packet received through the $m^{th}$ previous semi-persistent resource was stored. Thereafter, the UE returns to step 715 where it performs an error detection operation. The UE repeats the HARQ operation until a predetermined condition is satisfied.

Figure 8:
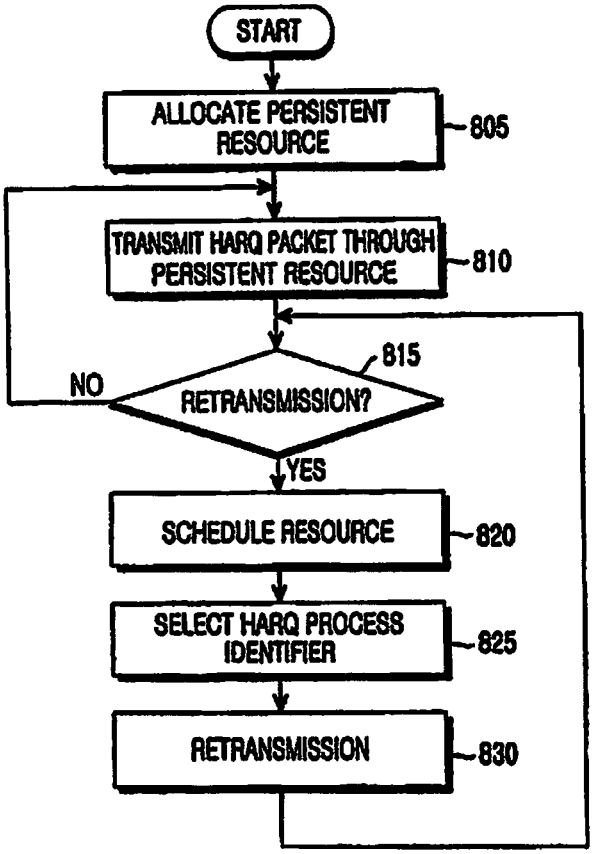
FIG. 8 is a flowchart illustrating an operation of transmitting a HARQ packet through semi-persistent resources in an ENB according to the present invention.

FIG. 8 is a flowchart illustrating an operation for transmitting a HARQ packet through semi-persistent resources in an ENB according to the present invention.

Referring to FIG. 8, in step 805, the ENB allocates semi-persistent resources to a UE to which it should allocate semi-persistent resources, such as VoIP. Thereafter, in step 810, the ENB transmits a HARQ packet to the UE using the semi-persistent resources. In step 815, the ENB determines whether to perform retransmission based on a HARQ feedback received from the UE. That is, the ENB checks a response channel from the UE to determine whether it has received a NACK signal (NACK) or an Acknowledge signal (ACK). If it has received an ACK signal, the ENB transmits an HARQ packet through semi-persistent resources at the next timing in step 810.

However, if the ENB has received a NACK signal, in step 820, the ENB performs a predetermined scheduling algorithm to determine transmission resources for HARQ retransmission. Thereafter, in step 825, the ENB determines an identifier of a HARQ process to be used for retransmission. When the above-described first embodiment is applied, the ENB uses the semi-persistent resource-dedicated HARQ process identifier agreed upon with the UE in the call setup process, for the retransmission. When the second embodiment is applied, the ENB uses, for the retransmission, a HARQ process identifier derived from time information of the timing at which an HARQ packet is transmitted through semi-persistent resources, among the semi-persistent resource-dedicated HARQ process identifiers agreed upon with the UE in the call setup process. When the third embodiment is applied, the ENB selects a proper HARQ process identifier depending on a time difference between the timing at which a retransmission packet is transmitted and the time at which a HARQ packet is transmitted through semi-persistent resources, among the semi-persistent resource-dedicated HARQ process identifiers agreed upon with the UE in the call setup process. In step 830, the ENB retransmits an HARQ packet using the allocated transmission resources and the selected HARQ process identifier. Thereafter, in step 815, the ENB checks if there is a need for another retransmission.

Figure 9:
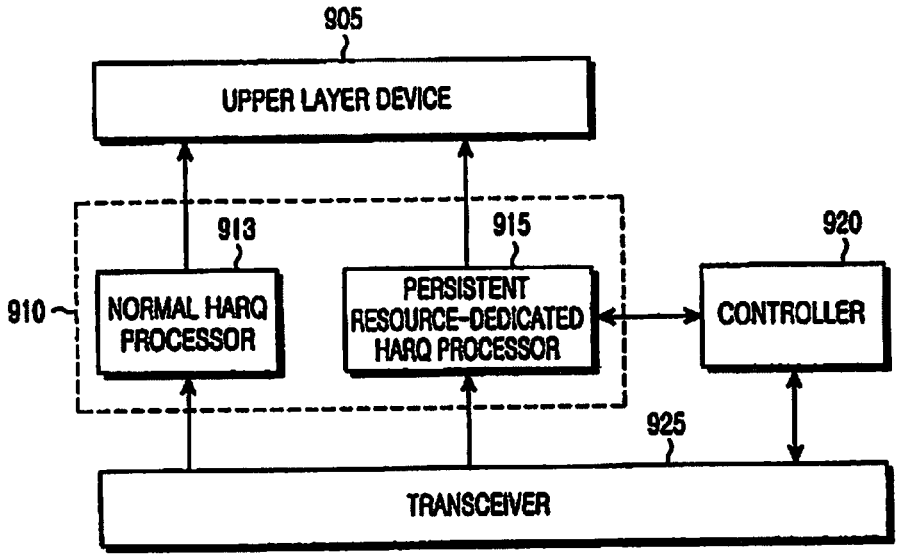
FIG. 9 is a block diagram illustrating an internal structure of a UE apparatus to which the present invention is applied.

FIG. 9 is a block diagram illustrating an internal structure of a UE apparatus to which the present invention is applied. It should be noted in FIG. 9 that only the elements essential to the present invention are shown and other elements irrelevant to the present invention are not shown for simplicity.

Referring to FIG. 9, the UE apparatus includes an upper layer device 905, a HARQ process 910, in which a normal HARQ processor 913 and a semi-persistent resource-dedicated HARQ processor 915 are included, a transceiver 925, and a controller 920. For each of the HARQ processors 913 and 915, at least one processor is provided in association with the service.

The controller 920 receives L1/L2 control information via the transceiver 925, and receives a HARQ packet using transmission resources identified through the received L1/L2 control information. Further, the controller 920 determines to which HARQ process it will deliver the received HARQ packet. The controller 920, when it receives a HARQ packet through semi-persistent resources, stores it in a HARQ process allocated for semi-persistent resources. That is, the controller 920 determines on which packet the corresponding retransmission is made, for the HARQ packet received through semi-persistent resources, depending on the HARQ process identifier acquired through an L1/L2 control channel, and controls the transceiver 925 so that the retransmitted HARQ packet is delivered to a proper HARQ process. In other words, the controller 920 controls the transceiver 925 so that it receives a retransmission packet having a semi-persistent resource-dedicated HARQ process identifier agreed upon in the call setup process according to the first embodiment.

Further, the controller 920 controls the transceiver 925 so that it receives a retransmission packet by checking a HARQ process identifier derived from time information of the timing at which a HARQ packet is transmitted through semi-persistent resources using the information acquired in the call setup process according to the second embodiment.

In addition, the controller 920 controls the transceiver 925 to select a HARQ process identifier depending on a time difference between the time at which a retransmission packet is transmitted and the time at which an HARQ packet is transmitted through semi-persistent resources according to the third embodiment, and receives a retransmission packet having the selected identifier.

Moreover, according to the fourth embodiment, the controller 920 detects an identifier through a relation with the semi-persistent resource allocation timing, using a Retransmission Sequence Number (RSN) signaled from an ENB, and selects a HARQ process associated with the corresponding identifier.

The transceiver 925 receives L1/L2 control information or a HARQ packet through a wireless channel. Generally, the transceiver 925 can include a Radio Frequency (RF) unit, an antenna, and a modem.

The HARQ process 910 includes soft buffers provided for performing a HARQ operation, and is identified by a HARQ process identifier. Therefore, the HARQ process 910 can be implemented with a memory. The semi-persistent resource-dedicated HARQ processor 915 stores therein the HARQ packet associated with semi-persistent resources.

The upper layer device 905 is for receiving the packet successfully received in the HARQ process, and performing a predetermined operation thereon.

Figure 10:
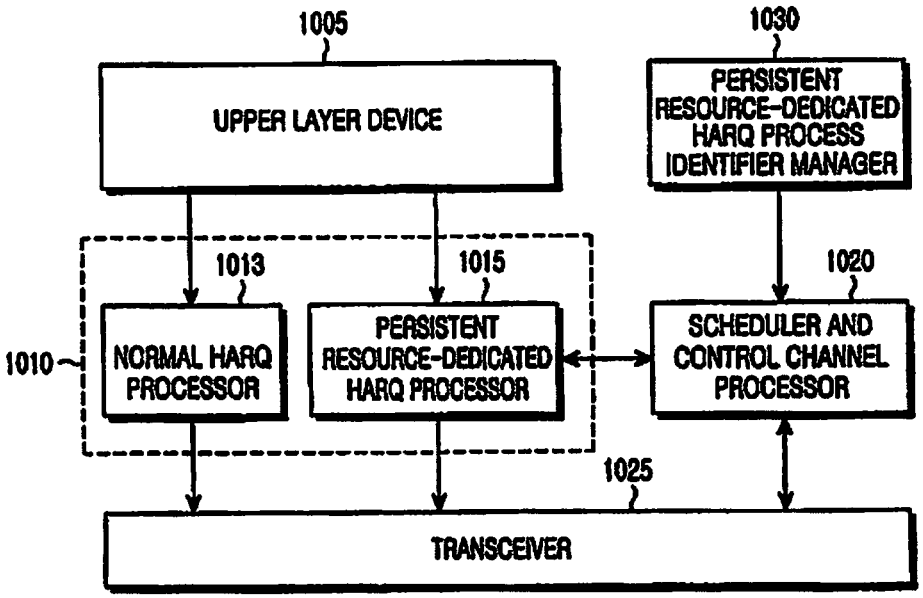
FIG. 10 is a block diagram illustrating an internal structure of an ENB apparatus according to the present invention.
Figure 11:
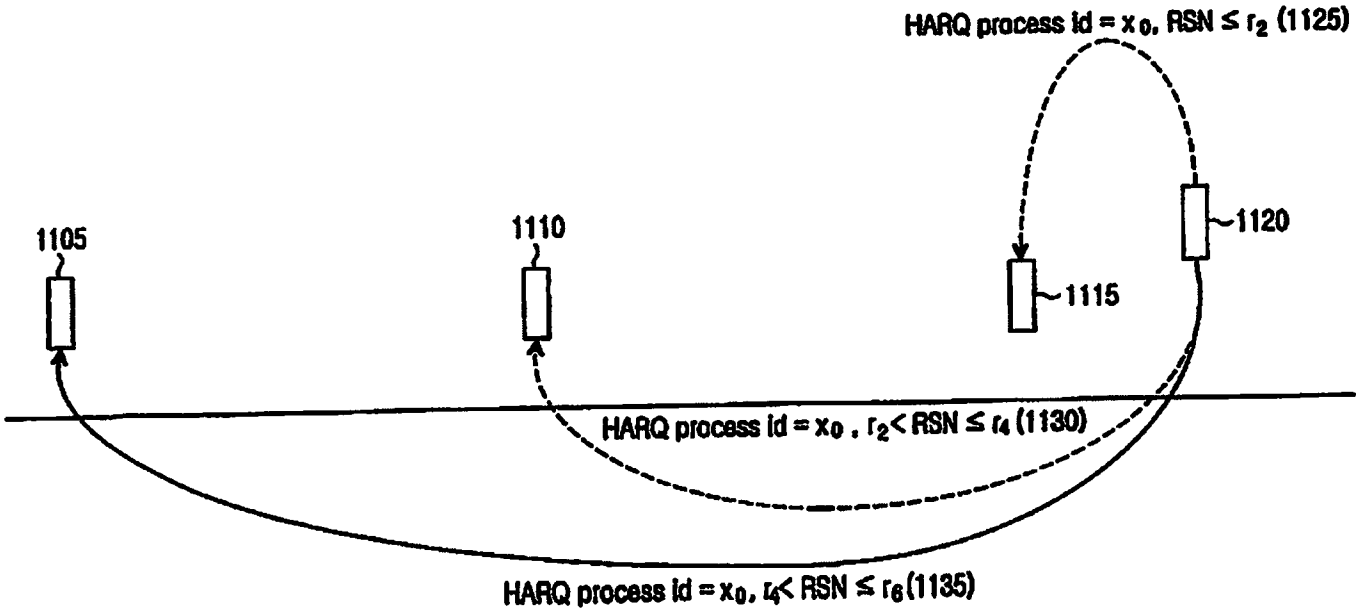
FIG. 11 is a diagram illustrating a procedure for HARQ-processing semi-persistent resource according to a fourth embodiment of the present invention.

FIG. 10 is a block diagram illustrating an internal structure of an ENB apparatus according to the present invention.

Referring to FIG. 10, the ENB apparatus includes an upper layer device 1005, a HARQ layer device (or HARQ process) 1010 in which a normal HARQ processor 1013 and a semi-persistent resource-dedicated HARQ processor 1015 are included, a transceiver 1025, a scheduler and control channel processor 1020, and a semi-persistent resource-dedicated HARQ process identifier manager 1030.

The scheduler and control channel processor 1020 allocates transmission resources to a UE through a predetermined scheduling operation, generates L1/L2 control information, and transmits it to the UE. The scheduler and control channel processor 1020 receives an HARQ process identifier notified from the semi-persistent resource-dedicated HARQ process identifier manager 1030 during retransmission on a HARQ packet to be transmitted through semi-persistent resources.

The semi-persistent resource-dedicated HARQ process identifier manager 1030 manages identifiers of HARQ processes allocated for semi-persistent resources. The semi-persistent resource-dedicated HARQ process identifier manager 1030, before execution of retransmission on the HARQ packet to be transmitted through semi-persistent resource, selects a semi-persistent resource-dedicated HARQ process identifier to be used, and notifies it to the scheduler and control channel processor 1020. That is, the semi-persistent resource-dedicated HARQ process identifier manager 1030 uses, for the retransmission, a semi-persistent resource-dedicated HARQ process identifier agreed upon in the call setup process according to the first embodiment of the present invention.

When the second embodiment is applied, the semi-persistent resource-dedicated HARQ process identifier manager 1030 uses, for the retransmission, a HARQ process identifier derived from time information of the timing at which a HARQ packet is transmitted through semi-persistent resources, among the semi-persistent resource-dedicated HARQ process identifiers agreed upon in the call setup process.

When the third embodiment is applied, the ENB selects a proper HARQ process identifier among the semi-persistent resource-dedicated HARQ process identifiers agreed upon with the UE in the call setup process, depending on a time difference between the timing at which a retransmission packet is transmitted and the timing at which a HARQ packet is transmitted through semi-persistent resources.

In the fourth embodiment, the semi-persistent resource-dedicated HARQ process identifier manager 1030 selects an identifier using RSN based on a relation with the semi-persistent resource allocation timing.

The transceiver 1025 is a device for transmitting L1/L2 control information or a HARQ packet through a wireless channel. The transceiver 1025 can include an antenna, an RF unit, and a modem. The HARQ process 1010 includes soft buffers provided for performing a HARQ operation, and can be implemented with a memory. The soft buffers are identified by HARQ process identifiers. The semi-persistent resource-dedicated HARQ processor 1015 processes only the HARQ packet associated with semi-persistent resources.

The upper layer device 1005 is for receiving a packet successfully received in the HARQ process 1010, and performing a predetermined operation thereon.

Fourth Embodiment

The fourth embodiment of the present invention provides a method for identifying a HARQ process in which a packet to be subject to soft-combining is stored, using other information rather than the HARQ process identifier. The fourth embodiment of the present invention indicates a HARQ process identifier using the soft-combining-related information like the RSN.

RSN is information indicating the sequence of HARQ retransmission. The fourth embodiment of the present invention restricts an RSN range available for a predetermined interval, thereby determining one of several HARQ processes, data stored in which should be soft-combined with the received data, using an RSN value of the received data. For example, in a system where 8 RSN code points $r_1$-$r_8$ are defined, an RSN for retransmission of an HARQ packet received through semi-persistent resources at an arbitrary timing is determined according to the rule defined as shown in Equation (6).

$RSN=r_1,r_2$ which can be used until the timing at which the first semi-persistent resource is allocated after semi-persistent resources $RSN=r_3,r_4$ which can be used until the timing at which the second semi-persistent resource is allocated after semi-persistent resources $RSN=r_5,r_6$ which can be used until the timing at which the third semi-persistent resource is allocated after semi-persistent resources $RSN=r_7,r_8$ which can be used until the timing at which the fourth semi-persistent resource is allocated after semi-persistent resources (6)

Upon successfully in decoding an L1/L2 control channel at an arbitrary timing, the UE checks a HARQ process identifier in the L1/L2 control channel, and if the HARQ process identifier indicates retransmission for the data received through semi-persistent resources, the UE checks an RSN of the L1/L2 control channel. If the RSN is $r_1$ or $r_2$ (1125), because the data indicates retransmission for the data 1115 received through semi-persistent resources at the nearest semi-persistent resource allocation timing, the UE soft-combines it with the data 1115 received through the nearest semi-persistent resources. If the RSN is $r_3$ or $r_4$ (1130), because the data indicates retransmission for the data 1110 received through semi-persistent resources at the second previous semi-persistent resource allocation timing from the current timing, the UE soft-combines it with the data 1110 received through the second previous semi-persistent resource from the current one. If the RSN is $r_5$ or $r_6$ (1135), because the data indicates retransmission for the data 1105 received through semi-persistent resources at the third previous semi-persistent resource allocation timing from the current timing, the UE soft-combines it with the data 1105 received through the third previous semi-persistent resource allocation timing from the current timing.

Figure 12:
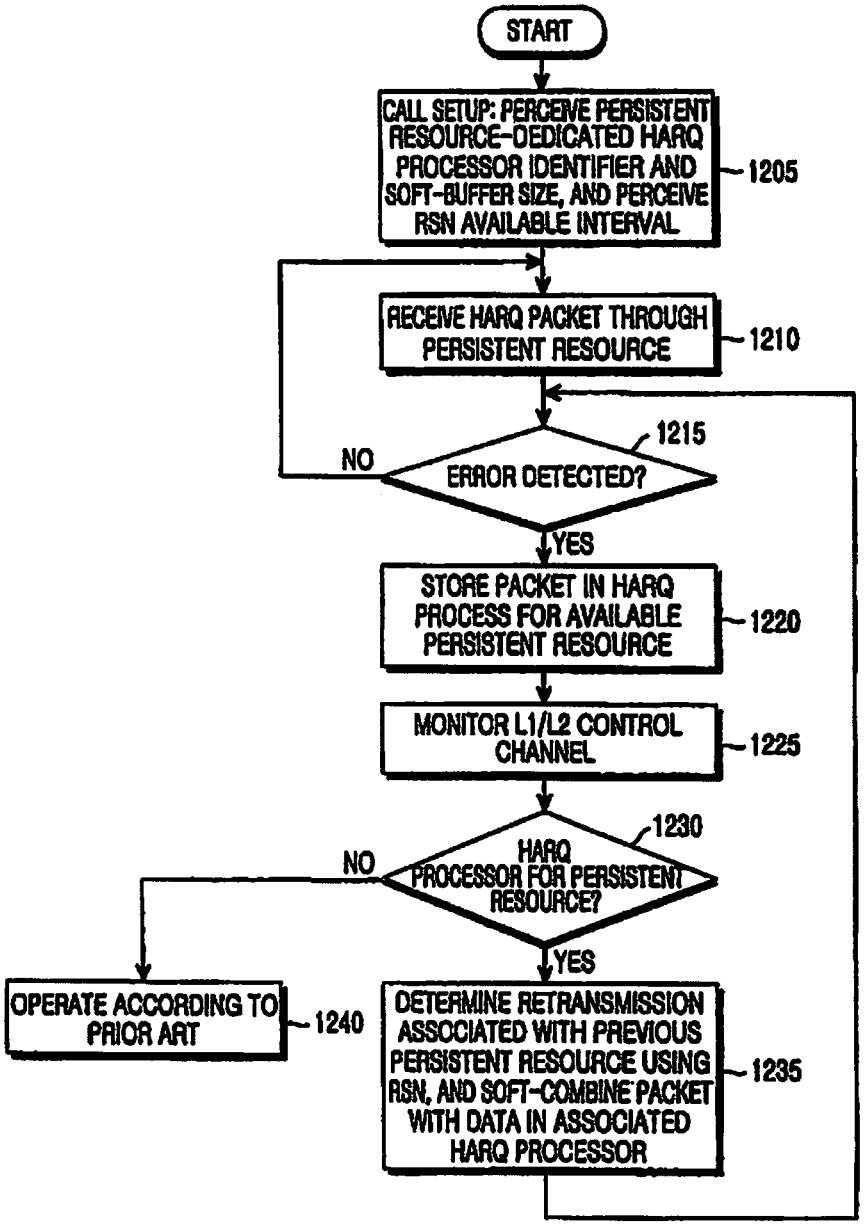
FIG. 12 is a flowchart illustrating an operation of receiving a HARQ packet in a UE according to the fourth embodiment of the present invention.

FIG. 12 is a flowchart illustrating an operation of receiving a HARQ packet in a UE according to the fourth embodiment of the present invention.

Referring to FIG. 12, in the call setup process of step 1205, the UE receives a signaling including a HARQ process identifier indicating a semi-persistent resource-dedicated HARQ process, the number and soft-buffer size of semi-persistent resource-dedicated HARQ processes, and an available interval of RSN. More specifically, when the number of HARQ processes allocated for semi-persistent resources is defined as n, the UE allocates n soft buffers corresponding to the buffer size for semi-persistent resources.

In addition, the UE receives a signaling including an identifier of a semi-persistent resource-dedicated HARQ process in the call setup process. The number of the identifiers is always one, regardless of the number of HARQ processes allocated for semi-persistent resources, and the semi-persistent resource-dedicated HARQ process identifier only indicates that the data received at an arbitrary timing is retransmission for the data received through semi-persistent resources, and RSN/retransmission mapping information indicates the HARQ process, retransmission for the data stored in which the received data corresponds to.

The UE receives a signaling including information by which it can identify a semi-persistent resource-dedicated HARQ process, i.e., the information on a relation between the RSN and the semi-persistent resource allocation timing, in the call setup process. This information indicates what previous semi-persistent resource allocation timing, retransmission for a packet received through semi-persistent resources in which an arbitrary RSN x is used for. This information is will be referred to herein as RSN/retransmission mapping information. In this case, when there are n RSNs of $r_1$ to $r_n$, the RSN/retransmission mapping information can be generated as defined in Equation (7).

$r_1$: It is used for retransmission on a packet received through semi-persistent resources at the just previous semi-persistent resource allocation timing $r_m$: It is used for retransmission on a packet received through semi-persistent resources at the $x^{th}$ previous semi-persistent resource allocation timing $r_n$: It is used for retransmission on a packet received through semi-persistent resources at the $y^{th}$ previous semi-persistent resource allocation timing (7)

The details of Equation (7) will be described by way of example. Assuming there are 4 RSNs, 0 to 3, the RSN/retransmission mapping information can be generated as defined below.

0: It is used for retransmission on a packet received through semi-persistent resources at the just previous semi-persistent resource allocation timing.

1: It is used for retransmission on a packet received through semi-persistent resources at the just previous semi-persistent resource allocation timing.

2: It is used for retransmission on a packet received through semi-persistent resources at the second previous semi-persistent resource allocation timing.

3: It is used for retransmission on a packet received through semi-persistent resources at the third previous semi-persistent resource allocation timing.

If the UE, which has completed the call setup process, is allocated semi-persistent resources at an arbitrary timing, the UE receives an HARQ packet through the semi-persistent resources in step 1210. Thereafter, the UE performs CRC calculation on the HARQ packet received through semi-persistent resources in step 1215 to check if there is an error in the HARQ packet. If there is no error, the UE delivers the HARQ packet to an upper layer, and waits until an HARQ packet is received through the next semi-persistent resources in step 1210.

If there is an error, in step 1220, the UE receives the HARQ packet through semi-persistent resources, and stores the HARQ packet having an error in one of the currently unused semi-persistent resource-dedicated HARQ processes in which no other data is stored, and then transmits a NACK signal. Thereafter, in step 1225, the UE monitors an L1/L2 control channel to receive HARQ retransmission.

Upon receiving an HARQ packet scheduled thereto, while monitoring the L1/L2 control channel, in step 1230, the UE checks if a HARQ process identifier of the HARQ packet corresponds to the semi-persistent resource-dedicated HARQ process identifier perceived in the call setup process. If the HARQ process identifier of the received HARQ packet indicates the fact that the HARQ packet is retransmission for a HARQ packet received through semi-persistent resources, the UE proceeds to step 1235, and otherwise, proceeds to step 1240.

In step 1240, the UE performs a predetermined operation according to the prior art. That is, the UE performs an operation of soft-combining the received HARQ packet with the packet stored in the HARQ process indicated by the HARQ process identifier of the packet, checking presence/absence of an error therein, and transmitting HARQ feedback information.

However, in step 1235, the UE checks the process, a packet associated with which the HARQ packet corresponds to, depending on the RSN of the received HARQ packet. That is, if RSN is an arbitrary k, the UE checks what previous semi-persistent resource allocation timing, retransmission on a packet received through semi-persistent resources in which is indicated by the k, depending on the RSN/retransmission mapping information, and soft-combines the packet with the received HARQ packet. Thereafter, in step 1215, the UE performs an error detection operation. The UE repeats the HARQ operation until a predetermined condition is satisfied.

As is apparent from the foregoing description, the application of the present invention identifies a packet HARQ-retransmitted through semi-persistent resources. Further, the present invention provides HARQ soft-combining by mapping the packet received through semi-persistent resources to the retransmitted HARQ packet. When there are several HARQ packets received through semi-persistent resources at an arbitrary time, a corresponding processor performs correct soft-combining by determining with which packet an arbitrary retransmission packet should be combined. Therefore, the present invention can prevent the communication failure or unnecessary retransmission caused by the packet perception error. In addition, the present invention can use semi-persistent resource-based HARQ without increasing complexity of the receiver.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

[1. A method for receiving data in a communication system, the method comprising:

acquiring a number of hybrid automatic repeat request (HARQ) processes of a semi-persistent resource allocation and semi-persistent resource allocation interval information;

identifying the semi-persistent resource allocation for a subframe based on the semi-persistent resource allocation interval information and time information;

acquiring a HARQ process identifier (ID) using the number of HARQ processes of the semi-persistent resource allocation, the semi-persistent resource allocation interval information, and the time information;

acquiring soft buffer information; and receiving data based on the semi-persistent resource allocation for the subframe, the HARQ process ID, and the soft buffer information.]

[2. The method of claim 1, further comprising setting the acquired HARQ process ID to a HARQ process ID for the subframe.]

[3. The method of claim 1, wherein the time information includes a System Frame Number (SFN) and a sub-frame number.]

[4. The method of claim 1, wherein the HARQ process ID is acquired based on:

HARQ process ID=s modulo n, where s is an integer derived from t/i, wherein t represents the time information, i represents the semi-persistent resource allocation interval information, and n represents the number of HARQ processes of the semi-persistent resource allocation.]

[5. A method for transmitting data in a communication system, the method comprising:

transmitting information representative of a number of hybrid automatic repeat request (HARQ) processes of a semi-persistent resource allocation and semi-persistent resource allocation interval information;

allocating the semi-persistent resource for a subframe based on the semi-persistent resource allocation interval information and time information;

acquiring a HARQ process identifier (ID) using the number of HARQ processes of the semi-persistent resource allocation, the semi-persistent resource allocation interval information, and the time information;

transmitting soft buffer information; and transmitting data based on the semi-persistent resource allocation for the subframe, the HARQ process ID, and the soft buffer information.]

[6. The method of claim 5, further comprising setting the acquired HARQ process ID to a HARQ process ID for the subframe.]

[7. The method of claim 5, wherein the time information includes a System Frame Number (SFN) and a sub-frame number.]

[8. The method of claim 5, wherein the HARQ process ID is acquired based on:

HARQ process ID=s modulo n, wherein s is an integer derived from t/i, t represents the time information, i represents the semi-persistent resource allocation interval information, and n represents the number of HARQ processes of the semi-persistent resource allocation.]

[9. An apparatus for receiving data in a communication system, the apparatus comprising:

a controller configured to acquire a number of hybrid automatic repeat request (HARQ) processes of a semi-persistent resource allocation and semi-persistent resource allocation interval information, identify the semi-persistent resource allocation for a subframe based on the semi-persistent resource allocation interval information and time information, acquire a HARQ process identifier (ID) using the number of HARQ processes of the semi-persistent resource allocation, the semi-persistent resource allocation interval information, and the time information; and a receiver configured to receive data based on the semi-persistent resource allocation for the subframe, the HARQ process ID, and the soft buffer information.]

[10. The apparatus of claim 9, wherein the controller is further configured to set the acquired HARQ process ID to a HARQ process ID for the subframe.]

[11. The apparatus of claim 9, wherein the time information includes a System Frame Number (SFN) and a sub-frame number.]

[12. The apparatus of claim 9, wherein the HARQ process ID is acquired based on:

HARQ process ID=s modulo n, wherein s is an integer derived from t/i, t represents the time information, i represents the semi-persistent resource allocation interval information, and n represents the number of HARQ processes of the semi-persistent resource allocation.]

[13. An apparatus for transmitting data in a communication system, the apparatus comprising:

a transmitter configured to transmit information representative of a number of hybrid automatic repeat request (HARQ) processes of a semi-persistent resource allocation and semi-persistent resource allocation interval information, transmit soft buffer information, and transmit data based on the semi-persistent resource allocation for a subframe, the HAW) process ID, and the soft buffer information; and a controller configured to allocate the semi-persistent resource for the subframe based on the semi-persistent resource allocation interval information and time information, and acquire a HARQ process identifier (ID) using the number of HARQ processes of the semi-persistent resource allocation, the semi-persistent resource allocation interval information, and the time information.]

[14. The apparatus of claim 13, wherein the controller is further configured to set the acquired HARQ process ID to a HARQ process ID for the subframe.]

[15. The apparatus of claim 13, wherein the time information includes a System Frame Number (SFN) and a sub-frame number.]

[16. The apparatus of claim 13, wherein the HARQ process ID is acquired based on:

HARQ process ID=s modulo n, wherein s is an integer derived from t/i, t represents the time information, i represents the semi-persistent resource allocation interval information, and n represents the number of HARQ processes of the semi-persistent resource allocation.]

*17. A method for receiving data in a communication system, the method comprising:*

*acquiring information on a number of hybrid automatic repeat request (HARQ) processes associated with a semi-persistent resource allocation and interval information associated with the semi-persistent resource allocation, the number of HARQ processes corresponding to a quantity of the HARQ processes allocated for the semi-persistent resource allocation;*

*identifying a HARQ process identifier (ID) by using the number of HARQ processes associated with the semi-persistent resource allocation, an interval based on the interval information, and a system frame number;*

*receiving, from a base station, first data of a semi-persistent initial transmission associated with the identified HARQ process ID based on the interval and the system frame number;*

*transmitting, to the base station, a HARQ feedback associated with the first data of the semi-persistent initial transmission;*

*receiving, from the base station, the HARQ process ID for a retransmission over a control channel; and*

*receiving, from the base station, second data of the retransmission associated with the HARQ process ID.*

*18. The method of claim 17, wherein the HARQ feedback is one bit.*

*19. The method of claim 18, wherein the HARQ feedback is a negative acknowledgement (NACK).*

*20. The method of claim 17, wherein the HARQ feedback is transmitted at a predetermined timing.*

*21. The method of claim 17, further comprising combining the first data of the semi-persistent initial transmission and the second data of the retransmission.*

*22. A method for transmitting data in a communication system, the method comprising:*

*transmitting, to a terminal, information representative of a number of hybrid automatic repeat request (HARQ) processes associated with a semi-persistent resource allocation and interval information associated with the semi-persistent resource allocation, the number of HARQ processes corresponding to a quantity of the HARQ processes allocated for the semi-persistent resource allocation;*

*identifying a HARQ process identifier (ID) by using the number of HARQ processes associated with the semi-persistent resource allocation, an interval associated with the interval information, and a system frame number;*

*transmitting, to the terminal, first data of a semi-persistent initial transmission associated with the identified HARQ process ID based on the interval and the system frame number;*

*receiving, from the terminal, a HARQ feedback associated with the first data of the semi-persistent initial transmission;*

*transmitting, to the terminal, the HARQ process ID for a retransmission over a control channel; and*

*transmitting, to the terminal, second data of the retransmission associated with the HARQ process ID.*

*23. The method of claim 22, wherein the HARQ feedback is one bit.*

*24. The method of claim 23, wherein the HARQ feedback is a negative acknowledgement (NACK).*

*25. The method of claim 22, wherein the HARQ feedback is transmitted at a predetermined timing.*

*26. A terminal apparatus for receiving data in a communication system, the terminal apparatus comprising:*

*a controller configured to:*

*acquire information on a number of hybrid automatic repeat request (HARQ) processes associated with a semi-persistent resource allocation and interval information associated with the semi-persistent resource allocation, the number of HARQ processes corresponding to a quantity of the HARQ processes allocated for the semi-persistent resource allocation, and*

*identify a HARQ process identifier (ID) by using the number of HARQ processes associated with the semi-persistent resource allocation, an interval based on the interval information, and a system frame number; and*

*a transceiver configured to:*

*receive, from a base station, first data of a semi-persistent initial transmission associated with the identified HARQ process ID based on the interval and the system frame number,*

*transmit, to the base station, a HARQ feedback associated with the first data of the semi-persistent initial transmission;*

*receive, from the base station, the HARQ process ID for a retransmission over a control channel, and*

*receive, from the base station, second data of the retransmission associated with the HARQ process ID.*

*27. The terminal apparatus of claim 26, wherein the HARQ feedback is one bit.*

*28. The terminal apparatus of claim 27, wherein the HARQ feedback is a negative acknowledgement (NACK).*

*29. The terminal apparatus of claim 26, wherein the HARQ feedback is transmitted at a predetermined timing.*

*30. The terminal apparatus of claim 26, wherein the controller is further configured to combine the first data of the semi-persistent initial transmission and the second data of the retransmission.*

*31. A base station apparatus for transmitting data in a communication system, the base station apparatus comprising:*

*a transceiver configured to:*

*transmit, to a terminal, information representative of a number of hybrid automatic repeat request (HARQ) processes associated with a semi-persistent resource allocation and interval information associated with the semi-persistent resource allocation, the number of HARQ processes corresponding to a quantity of the HARQ processes allocated for the semi-persistent resource allocation,*

*transmit, to the terminal first data of a semi-persistent initial transmission associated with a HARQ process identifier (ID) based on an interval associated with the interval information and a system frame number,*

*receive, from the terminal, a HARQ feedback associated with the first data of the semi-persistent initial transmission,*

*transmit, to the terminal, the HARQ process ID for a retransmission over a control channel, and*

*transmit to the terminal, second data of the retransmission associated with the HARQ process ID; and*

*a controller configured to identify the HARQ process ID by using the number of HARQ processes associated with the semi-persistent resource allocation, the interval, and the system frame number.*

*32. The base station apparatus of claim 31, wherein the HARQ feedback is one bit.*

*33. The base station apparatus of claim 32, wherein the HARQ feedback is a negative acknowledgement (NACK).*

*34. The base station apparatus of claim 31, wherein the HARQ feedback is transmitted at a predetermined timing.*

* * * * *